Jan. 5, 1965 R. SHATTUCK 3,163,888

PROCESS AND APPARATUS FOR HEATING PLASTIC GRANULES

Filed June 28, 1961 2 Sheets-Sheet 1

INVENTOR.
ROBERT SHATTUCK
BY
Woodhams Blanchard and Flynn
ATTORNEYS

PROCESS AND APPARATUS FOR HEATING PLASTIC GRANULES

Filed June 28, 1961 2 Sheets-Sheet 2

INVENTOR.
ROBERT SHATTUCK
BY
Woodhams Blanchard and Flynn
ATTORNEYS

United States Patent Office 3,163,888 Patented Jan. 5, 1965

3,163,888

PROCESS AND APPARATUS FOR HEATING PLASTIC GRANULES

Robert Shattuck, Parkersburg, W. Va., assignor to Borg-Warner Corporation, Chicago, Ill., a corporation of Illinois Filed June 28, 1961, Ser. No. 120,407
11 Claims. (Cl. 18—30)

This invention relates to a process and apparatus for preheating organic plastic material and it relates particularly to a process and apparatus adapted for preheating a quantity of plastic material and then discharging it directly into a plastic injection molding machine.

In many types of plastic molding operations, which vary both as regards the type of molding equipment involved and as regards the type of plastic material molded, it is necessary or at least desirable to preheat the plastic material before placing it in the molding machine. In view of the low heat conductivity of plastic materials, the preheating thereof has long presented a difficult problem and many attempts have been made in the past to solve this problem and these attempts have proceeded in a variety of ways. Some of the more common of these attempts to preheat plastic materials have involved di-electric heating and heating in an oven. However, many of the prior art preheaters are complex and, therefore, are expensive to purchase, maintain and/or operate, while others are such that it is difficult to coordinate their operation with the operation of the molding machine.

In connection with the operation of an injection molding machine, which may or may not be operated with plastic materials requiring preheating, it is desirable to devise an apparatus which can be mounted directly over the feed opening of the machine, which can in all cases operate as a device for feeding a metered charge of raw plastic material into said feed opening and which can act without change in the structure thereof as a metering device and as a preheater for the plastic material.

Accordingly, the objects of the invention are:

(1) To provide an apparatus for preheating organic plastic materials and which will be particularly adaptable for use on an injection molding machine.

(2) To provide an apparatus, as aforesaid, which will function conveniently with a charge metering device.

(3) To provide an apparatus, as aforesaid, which will be of sufficient simplicity that it will be economical in its original construction, its maintenance and its operation.

(4) To provide an apparatus, as aforesaid, which will preheat the plastic material to an acceptable degree of uniformity and which will deliver same as a metered charge to the molding machine.

(5) To provide an apparatus, as aforesaid, which will utilize warm air as the heating medium and which will cause same to flow substantially uniformly through the mass of plastic material being heated.

(6) To provide a process for preheating plastic material prior to injection molding thereof in which warm gas, such as air, will be circulated through a measured charge of material while the charge is held against substantial agitation thereby.

(7) To provide a preheating process, as aforesaid, which will be particularly adapted for preheating heat-sensitive plastic materials and which will heat them only to a temperature at which they may be held safely for a long period of time without harmful effects.

(8) To provide a preheating process, as aforesaid, which may be performed at a minimum of expense.

(9) To provide a preheating process, as aforesaid, which will effectively dry granular plastic material before same is supplied to a molding machine.

(10) To provide a preheating and drying process, as aforesaid, wherein the plastic may be satisfactorily dried and preliminarily warmed without causing same to adhere to an objectionable degree to the warming apparatus.

Other objects and purposes of the invention will be apparent to persons acquainted with apparatus of this general type upon reading the following specification and inspecting the accompanying drawings.

*General Description*

In general, the invention provides a chamber for holding the plastic material, which chamber is adjacent and communicates with the feed opening of a plastic injection molding machine. Means are provided for holding the plastic material introduced into the chamber against substantial movement therewithin. A gate is provided at the bottom of said chamber. The gate in one of its positions forms the bottom of the chamber and in another of its positions permits the plastic material therein to be discharged into the feed opening of the injection molding machine.

The walls of the chamber are perforated and suitably jacketed to provide for the introduction thereinto of a stream of warm gas under a very low pressure, such as three or four p.s.i.g. The gas is caused to circulate through the plastic material, utilizing the plastic material itself, at least in part, as a diffusing medium for the gas flow, and the gas then flows out of the chamber. By holding the plastic material snugly confined within such chamber and permitting the flow of gas at only a low rate, the gas will diffuse throughout the entire mass with a high degree of uniformity and provide the desired preheating.

*Detailed Description*

Figures 1, 2:
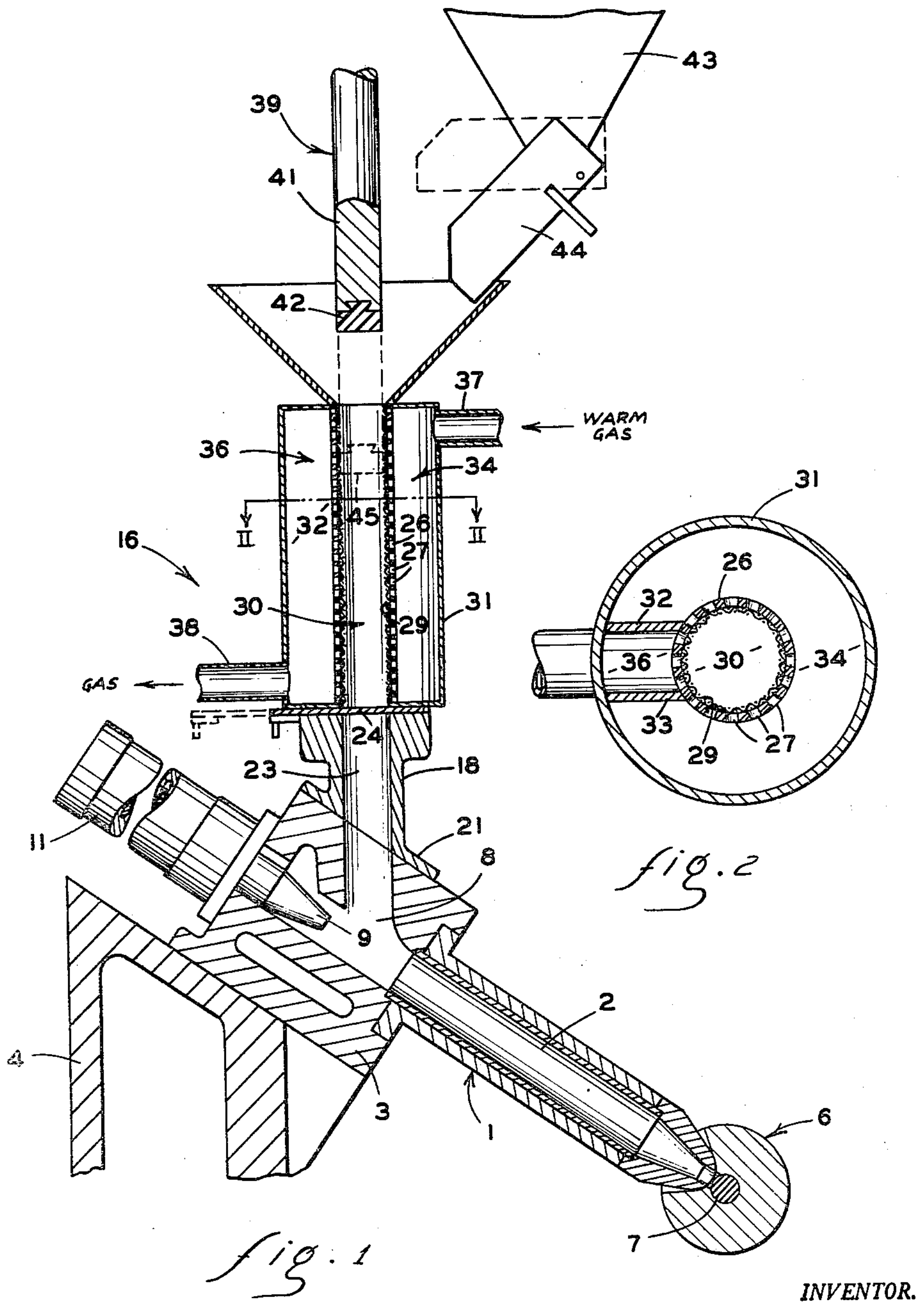
FIGURE 1 is a central, sectional, partially schematic view of a heater embodying the invention and placed in operative association with the feed opening of an injection molding machine.
FIGURE 2 is a sectional view taken on the line II—II of FIGURE 1.

In describing a typical embodiment of the invention, certain terminology will be used for convenience in reference, which terminology will be understood as being utilized for convenience only and having no limiting significance. For example, the terms "upwardly" and "downwardly" will be used in connection with the apparatus in its normal position of operation as illustrated in FIGURE 1 of the drawings. The terms "inward" and "outward" shall refer to directions toward and away from the geometric center of the apparatus. The terms "rightwardly" and "leftwardly" will be utilized with reference to the particular drawings in connection with which such words are used. Such terminology will also include derivatives of the words above specifically mentioned together with words of similar import.

Referring now to the drawings, there is shown in FIGURE 1 the feeding mechanism of a plastic injection molding machine of the type illustrated in application Serial No. 120,268, owned by the assignee of the present application, to which reference may be made for further details concerning one type of plastic injection molding machine with which the apparatus of the present invention may conveniently be used. In the apparatus shown, there is provided a feeding cylinder 1 having an elongated feeding chamber 2 located centrally therein. Said cylinder is connected to a base 3 which is mounted upon a support 4 which in turn is supported as needed with respect to the remainder of the molding machine. The feeding cylinder 1 is mounted for discharging plastic material into further plasticizing means 6 which, after suitably plasticizing the material, discharges same into an injection cylinder (not shown). A feed opening 8 is provided at a suitable point usually on the upper side of the feeding chamber 2 and a feeding ram 9 is mounted for reciprocation within said feeding chamber for positively forcing plastic material within said chamber therefrom into the plasticizing means 6. Said feeding ram 9 is operated by any convenient means, such as the pressure cylinder 11, which is actuated appropriately in coordination with the operation of the remainder of the machine.

The preheating unit, designated generally by the reference numeral 16 is mounted over the feed opening 8. The preheating unit 16 is comprised of a base portion 18 having a flange 21 which is fastened to the top wall of the base 3 by suitable fastening means, not shown. The base portion 18 has a discharge passageway 23 therein, which passageway may be selectively blocked by any convenient means, such as a slidable gate 24 which, in this embodiment, is shown being adapted for manual operation but which may also be operated automatically.

Mounted on and above said base portion 18 is a generally tubular, perforated structure 26 which in this embodiment is of circular cross section. The structure 26 is preferably made of a noncorrosive material, such as stainless steel, for obvious reasons, but other materials appropriate to the character of the plastic material being handled and to the gas used for warming same may be used, if desired. The perforations 27 within such structure 26 are both small and numerous in order to provide a high level of uniformity in the flow of warming gas therethrough. A screen 29 of very fine mesh is provided on the internal wall of structure 26 for the purpose of holding the plastic material therewithin but permitting flow of air therethrough. The structure 26 and screen 29 define the sides of a preheating chamber 30.

A jacket 31 surrounds the structure 26 and extends preferably the full length thereof. Partitions 32 and 33 are provided therein for dividing said jacket into a warm gas manifold 34 and a cold gas manifold 36. Said manifolds may be of a size with respect to each as desired but the warm gas manifold 34 is preferably substantially larger than the cold gas manifold 36 in order to insure a uniform flow of warm gas into the plastic material and the cold gas manifold is as small as possible without creating an undesirable increase in the velocity of gas flow thereinto outwardly from the plastic material. A warm gas inlet 37 is connected to the warm gas manifold 34 at a convenient point, preferably at the upper end thereof as shown in FIGURE 1. Said warm gas inlet 37 is connected through a valve (not shown) to any convenient source of warm gas under pressure, which gas preferably is dehumidified. The outlet 38 may be located on and in connection with the cold gas manifold 36 at any convenient point, preferably at the lower end thereof as shown in FIGURE 1.

The size and shape of said warm and cold gas manifolds 34 and 36, together with the size and location of the gas inlet 37 and gas outlet 38 with respect thereto, are all chosen such as that there will be a substantially uniform gas pressure from one end of the manifold 34 to the other and throughout the circumferential extent thereof and such that there will be a substantially uniform gas pressure in all parts of the cold gas manifold 36. In the specific embodiment herein illustrated, only a single inlet 37 is utilized for warm gas and only a single outlet 38 is utilized for cold gas. This is possible due to the relatively low pressure at which said gas moves and due to the relatively large volume of the manifolds 34 and 36 indicated in the drawings. Other designs for insuring substantially uniform gas pressure in the manifolds 34 and 36 are of course well known to the air-handling art and will be acceptable.

The outlet 38 may, if it is desirable to recirculate the heating and drying gas, be connected through suitable pressure creating means, as a pump and suitable drying means, as a desiccator, and back to the inlet 37. This will normally be done where air is used as the drying gas in order to conserve heat and will virtually always be done where a gas other than air is utilized in order to conserve both heat and the gas in question. However, the drying gas, particularly where air is used, may, if preferred, be merely vented to the atmosphere from the outlet 38 without change in the purpose or functioning of the apparatus or method with which the present invention is concerned.

A ram 39 is mounted for reciprocation within the preheating chamber 30. In this embodiment, the ram 39 comprises a body portion 41 having a facing 42 thereon which facing is made of a suitable material, such as polytetrafluroethylene. The material of which the facing 42 is made is chosen so that it will have the least possibility of chemical reaction either with the plastic material being handled within the apparatus or with the gas utilized for heating the plastic material. However, the facing 42 is preferably resilient and at least slightly compressible. The ram 39 fits within the screen 29 in as close sliding relationship therewith as possible but without creating the danger of tearing or otherwise damaging said screen. Said ram is moved vertically by any convenient means which may be either manual or pressure fluid operated.

A hopper structure 43 may be provided to supply a metered quantity of plastic material to the preheater 16. The hopper structure 43 desirably has a spout and gate structure 44 associated therewith which is here shown as manually operated but which may be operated automatically upon lifting of the ram 39 by any convenient automatic control means as desired. When said spout is in the position shown in solid lines, the desired amount of plastic material from said hopper will be delivered into the preheating chamber 30 and when said spout is in its closed position as shown in broken lines, the ram 39 is free to enter into said preheating chamber.

*Operation*

The operation of the apparatus above described has been somewhat indicated in the foregoing description but will be reviewed fully to insure a complete disclosure.

Assuming the hopper 43 is used as above described, the same will be filled with a predetermined charge of the granular plastic material, the ram 39 withdrawn to its upper position, the spout 44 lowered into its position as shown in solid lines and said charge of plastic material permitted to enter the preheating chamber 30. Any amount of plastic material up to the full volumetric capacity of the preheating chamber 30 may be supplied thereto without change in the operation of the apparatus.

When same is filled to the desired level indicated by the broken line 45, the spout 44 is returned to its closed position and the ram 39 caused to descend until its facing 42 rests upon the upper surface of the plastic material. Inasmuch as the function of said ram is partly to provide an upper impervious wall to prevent or at least minimize the escape of air upwardly out of the body of plastic material and partly to expel the preheated plastic mass from the preheating chamber, and for no other purpose, there is no appreciable pressure applied to the plastic material at this point by said ram. Said ram 39 will normally merely rest under its own weight on said plastic material but in some instances, as in the case of relatively soft material or where said ram is especially heavy, it may be actually supported by suitable means in order that said ram will not unduly compress said plastic material but will merely function as above set forth. Warm gas is then admitted through the inlet 37 to the warm gas manifold 34 and thence passes through the perforations in the structure 26 and through the screen 29 into the plastic material and does so throughout the entire zone surrounded by the warm gas manifold 34.

The warm gas flows into the plastic mass and is further diffused therein by the plastic granules themselves. The gas flows out of the mass through the cold gas manifold 36 and is discharged through the outlet 38.

The temperature of the gas as it enters the preheating chamber 30 will, of course, be a little higher than the temperature which it is desired to impart to the plastic granules but not so far in excess of such a temperature that the plastic granules will be overheated. The gas temperature will be controlled in accordance with the physical properties of the plastic material in order that same will not melt or soften excessively and thereby enter into or otherwise obstruct the screen 29. The gas is under only a very small pressure, such as three or four p.s.i.g., and the flow of such air is kept relatively low so that its pressure will be uniform throughout the warm air manifold 34 and similarly uniform throughout the cold air manifold 36 and, further, so that there is no tendency for said gas to form channels within said plastic material in order that the gas will flow uniformly, evenly, and smoothly therethrough.

It has been found by actual experimentation with apparatus of the invention that a much higher degree of uniformity of heating is obtained with low pressure gas flow as described herein than by other known methods including those where the plastic granules are suspended in a rapidly, upwardly flowing hot gas stream. Further, such experimentation has shown that in one specific embodiment of the invention it is possible to heat a quantity of 10 pounds of polystyrene from room temperature to a temperature of 325° F. and such heating is accomplished in approximately one minute.

By controlling the temperature of the gas entering the warm gas manifold 34, it is possible to control the final temperature of the plastic material in the preheating chamber 30. Where the plastic material being handled is heat sensitive, that is, it will be detrimentally affected by being heated to too high a temperature or by being held at a high temperature for too long a time, the temperature of the warm gas will be selected so that the plastic material will not be heated to such a temperature that it will be detrimentally affected.

When the plastic material has been suitably warmed, the flow of warming gas will normally be terminated, the gate 24 will be withdrawn and the plastic material permitted to drop through the discharge passageway 23 into the feeding cylinder 1. If necessary the ram 39 may be utilized to assist in moving the plastic material out of the preheating chamber 30. Where the preheating chamber 30 and the discharge passageway 23 are positioned on a vertical axis, such assistance from the ram 39 will normally be unnecessary. However, where, in order better to introduce the plastic charge into the feeding chamber, the preheating zone and discharge passageway are placed at an angle to the vertical or even placed horizontal, then the use of the ram 39 for ejecting the preheated charge from the preheating zone will be essential. It should be noted that the plastic material will be of granular or rubbery condition and hence will not form a rigid mass within the preheating chamber 30. Therefore, the charge ejected therefrom will be of flexible nature and able easily to negotiate any curves of reasonably large radius within the discharge passageway 23 or the feeding inlet 8. It will be appreciated that the preheating device is such that where the position of the feeding cylinder 1 provides a sharper curve than is indicated, such as where the feeding unit is positioned horizontally instead of the downwardly slanted position shown in the drawing, then suitable compensation may be made by placing the preheating unit at a substantial angle to the vertical and in some cases they may even be placed horizontally with suitable modification of the means for introducing granular plastic material thereinto.

*Modification*

Figures 3, 4:
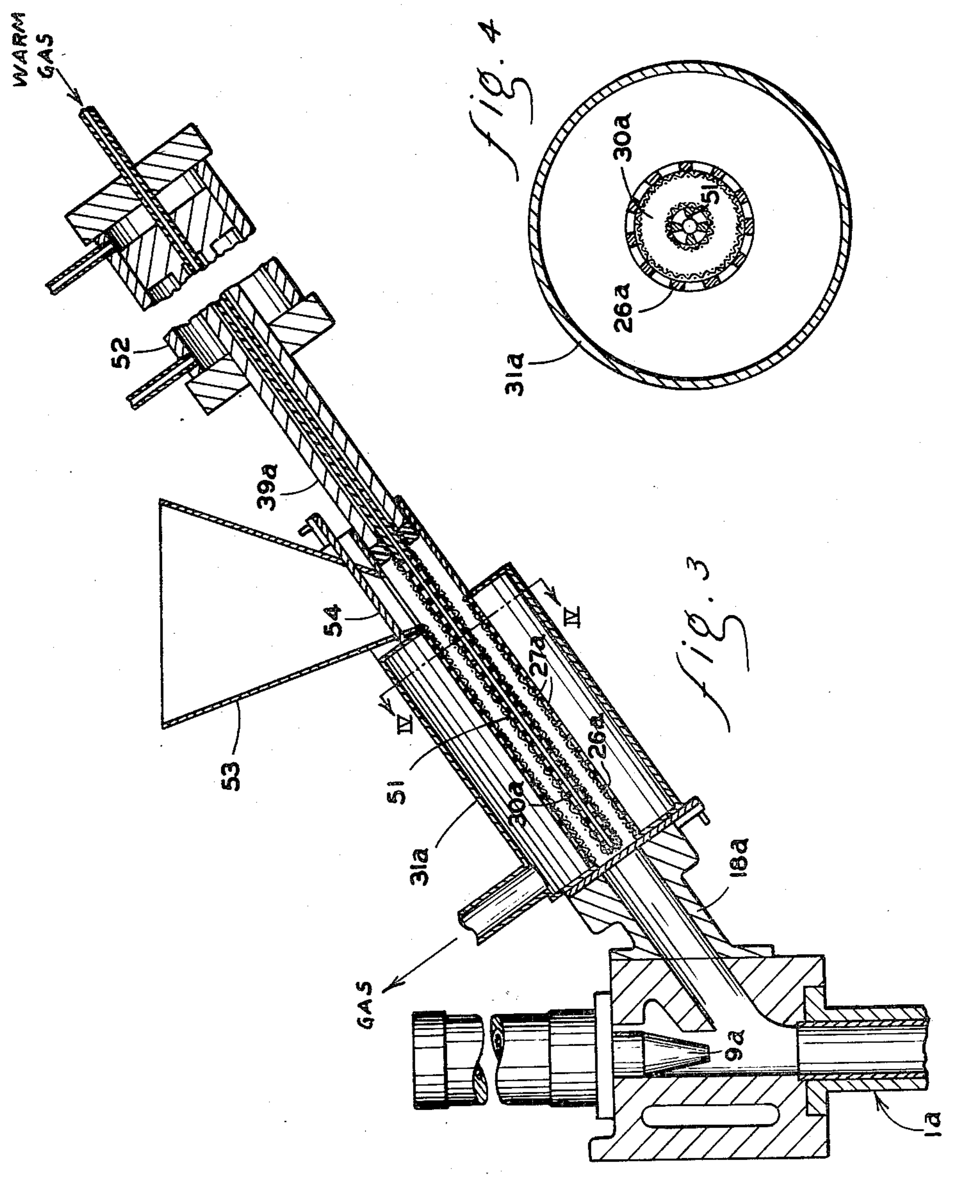
FIGURE 3 is a central, sectional view of a modification.
FIGURE 4 is a sectional view taken on the line IV—IV of FIGURE 3.

A further modification of the apparatus is shown in FIGURE 3 wherein the parts indicated by numerals followed by the subscript "*a*" are the same as those parts shown in FIGURES 1 and 2 and need no further description. However, in this case the warm air is supplied through a central, screen-covered, perforated tube 51 which is stationarily mounted within the preheating chamber 30*a*. The plunger 39*a* is sleeved on the tube 51 and said plunger is reciprocated by a fluid pressure cylinder 52. The tube 51 extends axially through and beyond said cylinder and its outer end is connected to a source of warm gas. Here the plastic material is supplied by a hopper 53 which communicates with a side opening in the preheating chamber 30*a*. A gate 54 may be provided in the hopper, if desired, to prevent the warm gas from exiting therethrough.

This embodiment provides a somewhat more uniform application of heating gas to the plastic material than does the form shown in FIGURES 1 and 2 and hence is particularly adaptable for plastic materials which require very accurate temperature control. However, this embodiment is somewhat more expensive and more complicated to operate than is the form shown in FIGURES 1 and 2 and hence for many uses is not as desirable as is the form shown in FIGURES 1 and 2.

Although particular preferred embodiments of the invention have been disclosed above in detail for illustrative purposes, it will be understood that variations or modifications in such disclosure, which lie within the scope of the appended claims, are fully contemplated.

What is claimed is:

1. In a preheating device especially for use in connection with a plastic injection molding machine, the combination comprising:

elongated, perforate, tubular means defining the side of an elongated preheating zone;

means for introducing heating gas substantially uniformly through a portion of said perforations into said zone, said portion extending along substantially the entire length of said zone, and another means withdrawing spent heating gas from said zone through another portion of said perforations, said another portion extending along substantially the entire length of said zone, said another portion being circumferentially spaced from said first-mentioned portion and being out of communication therewith except through said zone;

imperforate withdrawable closure means for temporarily closing one axial end of said zone, and an imperforate ram slidably insertable into the other axial end of said zone whereby said ram may be withdrawn for charging said zone with plastic material to be preheated and may then be utilized to hold said plastic material snugly against the perforate means defining said zone and finally may be utilized to expel plastic material from within said zone upon withdrawal of said closure means.

2. The device defined in claim 1 wherein said means for introducing gas into said zone consists of first jacket means surrounding said portion of said perforated tubular means and an inlet for heated gas connected to said first jacket means; and said means for withdrawing spent gas from said zone comprises second jacket means adjacent said another portion of said perforated tube and a discharge connection to said second jacket means.

3. In a plastic injection molding machine having an inlet opening for raw plastic material, the improvement comprising in combination:

wall means defining an elongated preheating zone of constant cross section arranged substantially as a continuation of and of the same diameter as said inlet opening, at least a substantial portion of said wall means thereof being perforated;

a perforated tube having a central opening therein, said tube being located within said zone and arranged with its axis parallel with the axis of said zone;

means for introducing warm gas into the central opening of said tube;

a gate removably blocking the lower end of said zone and a vertically movable piston surrounding said tube and axially slidably arranged within the upper end of said zone;

means for receiving and exhausting spent fluid from within said zone.

4. A process for preheating a granular, organic plastic material, comprising the steps:

placing a charge of granular organic plastic material into an elongated preheating zone, holding said charge at both longitudinal ends of said zone to prevent substantial movement of said charge within said zone and simultaneously preventing flow of gas through said ends;

introducing a stream of heated gas at a velocity insufficient to disturb the relative positions of the granules comprising said charge with respect to each other and at a substantially uniform pressure into one region of said zone uniformly along substantially the entire longitudinal extent of said zone and causing said stream to move essentially laterally through said zone and continuously withdrawing the gas from another region of said zone along substantially the entire longitudinal extent of said zone, said another region being laterally spaced from said one region so that the gas contacts the entirety of the charge as it moves between said regions whereby the entirety of the charge is heated uniformly;

and then terminating flow of heated gas into said zone and discharging the entirety of the charge from said zone.

5. A heating apparatus for heating an organic plastic material, comprising in combination:

a tubular, perforate screen defining the side wall of an elongated preheating zone;

an imperforate jacket encircling said screen, said jacket being spaced from said screen;

a pair of imperforate, spaced partitions extending substantially lengthwise with respect to the lengthwise axis of said zone and extending between said jacket and said screen and dividing the space between said jacket and said screen into a warm gas manifold and a cold gas manifold, said manifolds both extending substantially to, and being unobstructed between, both axial ends of said screen;

a warm gas inlet connected to said warm gas manifold; and a cold gas outlet connected to said cold gas manifold.

6. A heating apparatus according to claim 5 in which said cold gas manifold is of substantially smaller size than said warm gas manifold;

and including an imperforate gate receivable across one axial end of said screen and an imperforate plunger axially slidable within said screen through the other axial end thereof and being of such size that it can slide through said zone substantially to said one end thereof to discharge the material from said zone.

7. A heating apparatus for heating an organic plastic material, comprising in combination:

a tubular, perforate screen defining the side wall of an elongated preheating zone;

an imperforate jacket encircling said screen, said jacket being spaced from said screen;

means defining an opening communicating with the space between said jacket and said screen;

a stationary perforate tube disposed within and extending lengthwise of said preheating zone, said tube being spaced from said screen so that the material to be heated can be placed between said tube and said screen;

means defining an opening communicating with the interior of said tube;

a hollow plunger sleeved over said tube and movable axially with respect thereto in said zone;

whereby warm gas may be supplied to one of said openings, may pass through the material disposed between said tube and said screen and then may be removed through the other opening.

8. A heating apparatus for heating an organic plastic material, comprising:

a tubular perforate screen defining the side wall of an elongated preheating zone;

first manifold means for introducing heated gas into said zone, said first manifold means extending along substantially the entire length of said zone and being unobstructed between its longitudinal ends so that heated gas can be uniformly fed into said zone throughout its length;

second manifold means for removing heated gas from said zone, said second manifold means being extended along substantially the entire length of said zone and being unobstructed between its longitudinal ends so that heated gas can be uniformly removed from said zone, said second manifold means being offset from said first manifold means and being isolated from communication therewith except through said zone;

imperforate, withdrawable closure means for temporarily closing one axial end of said zone; and an imperforate ram closely slidably receivable into said zone through the other axial end thereof and being movable through said zone substantially to said one axial end thereof whereby said ram can be withdrawn from said zone for charging said zone with plastic material to be heated and then can be used to hold the plastic material within said zone with both axial ends of said zone being closed and finally can be used to discharge the plastic material from said zone upon withdrawal of said closure means.

9. A process according to claim 4, in which said charge is held by means including an imperforate movable ram at one end of the preheating zone and an imperforate withdrawable closure means at the other end of the preheating zone and including the steps of maintaining said ram in position so that it does not effect substantial compression of the plastic material while heated gas is being supplied to the preheating zone and discharging the charge from the preheating zone by withdrawing said closure means and moving said ram through said zone toward said other end thereof.

10. In a preheating device especially for use in connection with a plastic injection molding machine, the combination comprising:

elongated and hollow means defining the walls of a preheating zone, first and second portions of said walls being perforated and inlet and outlet openings being provided through said walls;

means for introducing heating gas substantially uniformly through said first portion, said portion extending along substantially the entire length of said zone and other means for withdrawing spent heating gas from said zone through said second portion, said second portion extending along substantially the entire length of said zone, said second portion being laterally spaced from said first portion and being out of communication with said first portion except through said zone;

imperforate withdrawable closure means for temporarily closing the outlet of said zone and an imperforate ram slidably insertable into the inlet of said zone whereby said ram may be withdrawn for charging said zone with plastic material to be preheated and may then be utilized to hold said plastic material against the other walls of said means defining said zone and finally may be utilized to expel plastic material from within said zone upon withdrawal of said closure means.

11. A heating apparatus for heating an organic plastic material, comprising:

hollow means including first and second perforate screens defining the walls of an elongated preheating zone, said hollow means further defining oppositely positioned inlet and outlet openings;

first manifold means for introducing heated gas through said first screen into said zone, said first manifold means extending along substantially the entire length of said zone and being unobstructed between its longitudinal ends so that heated gas can be uniformly fed into said zone throughout its length;

second manifold means for removing heated gas through said second screen from said zone, said second manifold means being extended along substantially the entire length of said zone and being unobstructed between its longitudinal ends so that heated gas can be uniformly removed from said zone, said second manifold means being offset from said first manifold means and being isolated from communication therewith except through said zone;

withdrawable closure means for temporarily closing said outlet; and a ram closely slidably receivable into said zone through said inlet and being movable into said zone whereby said ram can be withdrawn from said zone for charging said zone with plastic material to be heated and then can be used to hold the plastic material within said zone with both said inlet and said outlet being closed and finally can be used to discharge the plastic material from said zone upon withdrawal of said closure means.

References Cited in the file of this patent

UNITED STATES PATENTS

| | | |
|---|---|---|
| 2,321,756 | Kyle | June 15, 1943 |
| 2,439,741 | Litty | Apr. 13, 1948 |
| 2,453,568 | Calleia | Nov. 9, 1948 |
| 2,493,218 | Bergstrom | Jan. 3, 1950 |
| 3,047,473 | Schmidt | July 31, 1962 |
| 3,067,458 | Dauchert | Dec. 11, 1962 |

FOREIGN PATENTS

| | | |
|---|---|---|
| 832,922 | Great Britain | Apr. 21, 1960 |